Sept. 5, 1939.　　　J H. S. PARKER　　　2,172,257
FILM PACK CONSTRUCTION
Filed Nov. 13, 1937
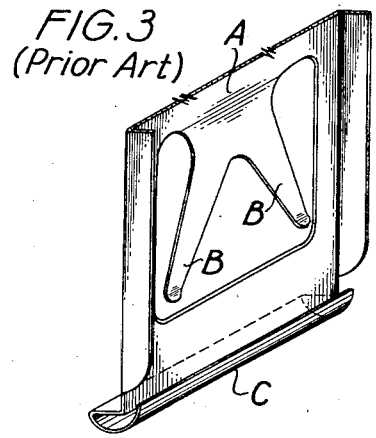
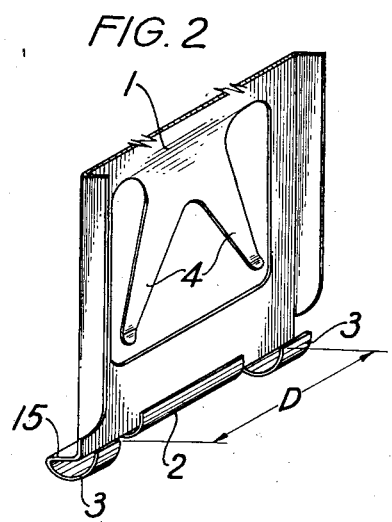
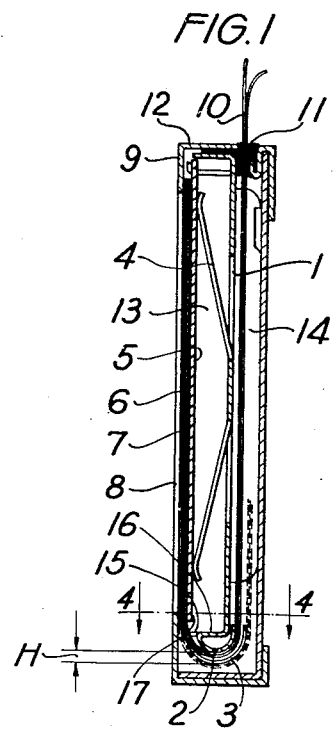
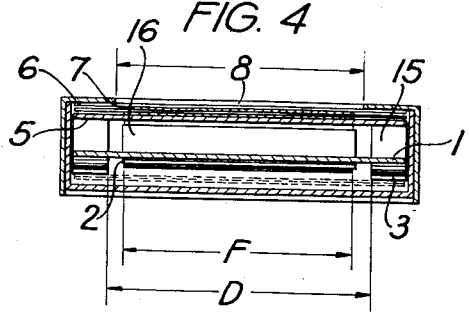
J Henry S. Parker
INVENTOR
BY
ATTORNEYS Patented Sept. 5, 1939

2,172,257

UNITED STATES PATENT OFFICE 2,172,257

FILM PACK CONSTRUCTION

J Henry S. Parker, Rochester, N. Y., assignor to Eastman Kodak Company, Rochester, N. Y., a corporation of New Jersey Application November 13, 1937, Serial No. 174,450

4 Claims. (Cl. 95—22)

This invention relates to photography and more particularly to the construction of film packs.

One object of my invention is to provide a film pack which is adapted for use particularly with film which is extremely sensitive. Another object of my invention is to provide a film pack with a casing divided into an unexposed and an exposed film chamber and to provide a means for guiding the films from one chamber to the other in which the films will be spaced from the rest of the pack to eliminate possible contact between the films and parts of the pack which may otherwise cause abrasion. Another object of my invention is to provide a film pack with a dividing partition, the end of which is divided into two separate sections, one for guiding films from one side of the partition to the other and the other for guiding film pack tabs through a separate path from one side of the partition to the other. Other objects will appear from the following specification, the novel features being particularly pointed out in the claims at the end thereof.

Coming now to the drawing wherein like reference characters denote like parts throughout:

Fig. 1 is a longitudinal section through a film pack constructed in accordance with and embodying a preferred form of my invention.

Fig. 2 is a fragmentary sectional perspective view of a film pack partition plate removed from the casing and constructed in accordance with the showing of Fig. 1.

Fig. 3 is a similar view of a known type of film pack partition plate.

Fig. 4 is a section taken on line 4—4 of Fig. 1.

It has been customary in the past to have a film pack consisting of a casing, the casing being divided into two sections by means of a partition plate around one end of which film tabs attached to films are passed. By drawing one film pack tab after another through a light-tight opening in the film pack casing, the individual films may be drawn around the end of the partition plate. A film pack of the type preferred to is shown in Patent 1,219,588, Ruttan and Hutchings, granted March 20, 1917.

The present invention is particularly directed to improving the film pack structure so that the possibilities of pressure occurring on the picture areas of the films being drawn around the end of the partition plate is eliminated.

In Fig. 3, the known type of septum is shown at A, this septum being provided with the usual spring fingers B and a rolled lower edge C over which both the film and backing papers may be drawn. However, it is obvious that when the film pack is full and there are a number of tabs—usually 12—passing around the rolled surface C, films being drawn around this surface must ride up over the stack of film pack tabs lying against it so that pressure markings, particularly with the new highly sensitive films, are liable to result.

In accordance with the present invention, the construction of the partition is materially altered. As indicated in Fig. 2, the partition plate 1 is similar to that of the partition plate A (shown as the prior art), except that the lower edge has been altered. In accordance with my present invention, I change the rolled edge C to a rolled edge consisting of three different formings. The central forming 2 is of relatively small diameter as indicated in Fig. 1, and the end formings 3 are of somewhat greater diameter so as to form a support for the edges of the film. The distance between the two end formings, indicated at D in Fig. 2, is preferably made made somewhat greater than the normal width of the film pack tabs which is shown at F in Fig. 4. Thus, the film pack tabs will lie entirely between the large edge formings 3 against the smaller central forming 2. The shape of the formings 2 and 3 can be conveniently made substantially the same, except that the edge formings are of a larger radii of curvature than the central forming. There exists between these two formings a space indicated in Fig. 1 as H, which is at least as great as the sum of the thicknesses of all of the film pack tabs. Thus, if there are 12 film pack tabs which together form a pile of say, $\frac{1}{32}$ of an inch, the space H will be preferably made somewhat greater than $\frac{1}{32}$ of an inch.

Other than the construction of the partition plate 1, the film pack may be of the usual construction. A typical film pack comprises the partition plate 1 having forwardly-extending spring arms 4 adapted to thrust a presser plate 5 forwardly so as to hold the films 6 with their backing papers 7 flat against the exposure frame 8 in the front wall 9 of the film pack. As is customary, each of the films 6 is equipped with a backing paper 7, the end of which 10 forms the tab which projects through a light-tight opening 11 in the top wall 12 of the film pack, by which the films are drawn from the front or unexposed film chamber 13 to the rear or exposed film chamber 14. It should be noted from Fig. 1 that the film pack tabs lie about the small center forming 2 and that the films, in passing from chamber 13 to chamber 14, pass about the large forming 3. Thus, the film pack tabs and films pass through separate paths in moving from one chamber to the other so that only the backing paper for each individual film is brought into contact with the larger formings 3 which support the films entirely by their edges. Moreover, as is indicated in Fig. 4, the width of the formings 3 is such that they contact with only the edges of the film which lie outside of the exposure frame 8. If the frictional contact between the film backing paper and the larger formings 3 is sufficiently great to cause pressure markings, such pressure markings will be solely along the edges of the film outside of the exposure area.

However, the greatest difficulty with previous film packs has been that since the center part of the film, in passing over the rolled edge C of Fig. 3, would contact with the stack of film pack tabs also passing over the same forming, the friction would be sufficient to mark the new and more highly sensitized film. By providing a separate path for the film tabs which is spaced from the path of the films, all pressure over the picture area of films is necessarily eliminated, so that markings cannot occur.

From Fig. 1 it should be noted that the formings 2 and 3 each terminate in parallel shoulders 15 and 16 which lie just beneath the lower edge 17 of the presser plate 5. Thus, any film which is drawn from the presser plate will pass down to the shoulder portion 15 of the larger forming 3, while the film pack tabs, being of a width to pass between the formings 3, will pass around the smaller forming 2. As the films are used one after the other, the film presser plate 15 moves outwardly so that there is never any difficulty in properly directing the film and film pack tabs to their proper paths. In Fig. 1, for the sake of clearness, only two films with their respective backing papers and film pack tabs have been illustrated. Actually, the normal film pack uses 12 of such films and film tabs.

It will be obvious from the above description that the rolled end of the partition of the film pack, when constructed in accordance with my invention, definitely spaces the film pack tabs from the exposure area of the films and that consequently all pressure on the exposure area of the films is eliminated.

What I claim is:

1. A photographic film pack containing a plurality of sensitized films and a plurality of tabs narrower than said films and each of which is attached to one of said films, and a partition wall dividing the interior of said pack into an exposed film chamber and an unexposed film chamber, each of said films being moved by one of said tabs around one end of said partition wall as the film is moved from said unexposed film chamber to the exposed film chamber, said partition wall carrying on one end a pair of film guiding members each having an arcuate guiding surface extending from one chamber into the other chamber and each spaced from the other and extending from said partition wall to form an intermediate passage for the tabs attached to the unexposed films between the end of said wall and a film which is being moved.

2. In a film pack, the combination with a casing having an exposed film chamber apertured at one end and an unexposed film chamber, a partition dividing the pack into the said two chambers and including an end about which films and film tabs may pass, a plurality of films and a plurality of tabs, one attached to each film, said tabs being of less width than the width of the films, and extending through the casing aperture, said partition plate including on said end an intermediately located forming and a pair of arcuate formings each on opposite sides of and each of greater radial and angular extent than said first-mentioned forming, said arcuate formings extending from one chamber into the other chamber whereby the narrow tabs may lie between and the wider film may curve around the larger arcuate formings in moving film by the tabs from the unexposed to the exposed film chambers.

3. In a film pack, the combination with a casing having an exposure aperture in one side, of a partition dividing the casing into two chambers, one behind the exposure aperture for unexposed film and the other for exposed film, a plurality of films and a tab of less width than the films attached to each film extending around the end of the partition, a curved wall having edges carried by the partition about which the tabs may be drawn, the curved wall being of substantially the width of the film pack tabs, separate curved walls having edges at the ends of said first mentioned curved wall spaced to engage the edges of a film, the edges being spaced from the first mentioned curved wall edges, said second mentioned curved walls being larger in cross-section than the first mentioned wall, the first and second mentioned curved walls extending from one chamber to the other, whereby the tabs and films may pass through separate paths in moving from the unexposed to the exposed film chamber.

4. In a film pack, the combination with a casing having an exposure aperture in one side, of a partition dividing the casing into two chambers, one behind the exposure aperture for unexposed film and the other for exposed film, a plurality of films and a tab of less width than the films attached to each film extending around the end of the partition, a curved wall having edges carried by the partition about which the tabs may be drawn, the curved wall being of substantially the width of the film pack tabs, separate curved walls at the ends of said first mentioned curved wall spaced to engage the edges of a film and including edges spaced from the edges of the first mentioned curved wall, the curved walls extending from one chamber to the other, said curved wall and said end curved walls differing in cross-section and in size, being offset a distance at least as great as the sum of the thickness of all the film pack tabs, whereby the tabs, by lying over the small curved wall, may not obstruct or project into the path of a film passing over the large end curved walls.

J HENRY S. PARKER.